(12) United States Patent
Magome et al.

(10) Patent No.: US 6,304,535 B1
(45) Date of Patent: Oct. 16, 2001

(54) DISC DISCRIMINATING DEVICE IN DISC PLAYBACK APPARATUS

(75) Inventors: Takahiro Magome, Tokyo; Yoshitaka Kon, Kawasaki, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/233,196

(22) Filed: Jan. 20, 1999

(30) Foreign Application Priority Data

Jan. 21, 1998 (JP) .................................................. 10-009476
Jan. 13, 1999 (JP) .................................................. 11-006015

(51) Int. Cl.$^7$ ....................................................... G11B 5/09
(52) U.S. Cl. ......................................................... 369/53.2
(58) Field of Search ................................ 369/58, 54, 47, 369/48, 50, 53.2, 53.22, 53.37, 53.41, 53.45, 47.43, 47.39

(56) References Cited

U.S. PATENT DOCUMENTS

| 4,653,040 | * | 3/1987 | Senso | 369/239 |
|---|---|---|---|---|
| 5,644,561 | * | 7/1997 | Son et al. | 369/50 |
| 5,745,460 | * | 4/1998 | Tateishi | 369/50 |
| 5,764,610 | * | 6/1998 | Yoshida et al. | 369/58 |
| 5,974,014 | * | 10/1999 | Tajiri | 369/58 |
| 6,141,307 | * | 10/2000 | Yoshioka | 369/58 |

FOREIGN PATENT DOCUMENTS

| 1098161 | * | 4/1989 | (JP) . |
|---|---|---|---|
| 4067463 | * | 3/1992 | (JP) . |
| 10302380 | * | 11/1998 | (JP) . |

* cited by examiner

Primary Examiner—Thang V. Tran
(74) Attorney, Agent, or Firm—Oblon, Spivak, McClelland, Maier & Neustadt, P.C.

(57) ABSTRACT

A disc discriminating device that can be realized in a comparatively simple structure to discriminate a disc in a short time, can be obtained. A playback apparatus is set in either the DVD process mode or the CD process mode. A disc is rotated at a constant linear velocity and the rotation frequency of a disc motor is detected by a control unit. The rotation frequency obtained when a DVD is loaded is lower than that when a CD is loaded.

8 Claims, 7 Drawing Sheets

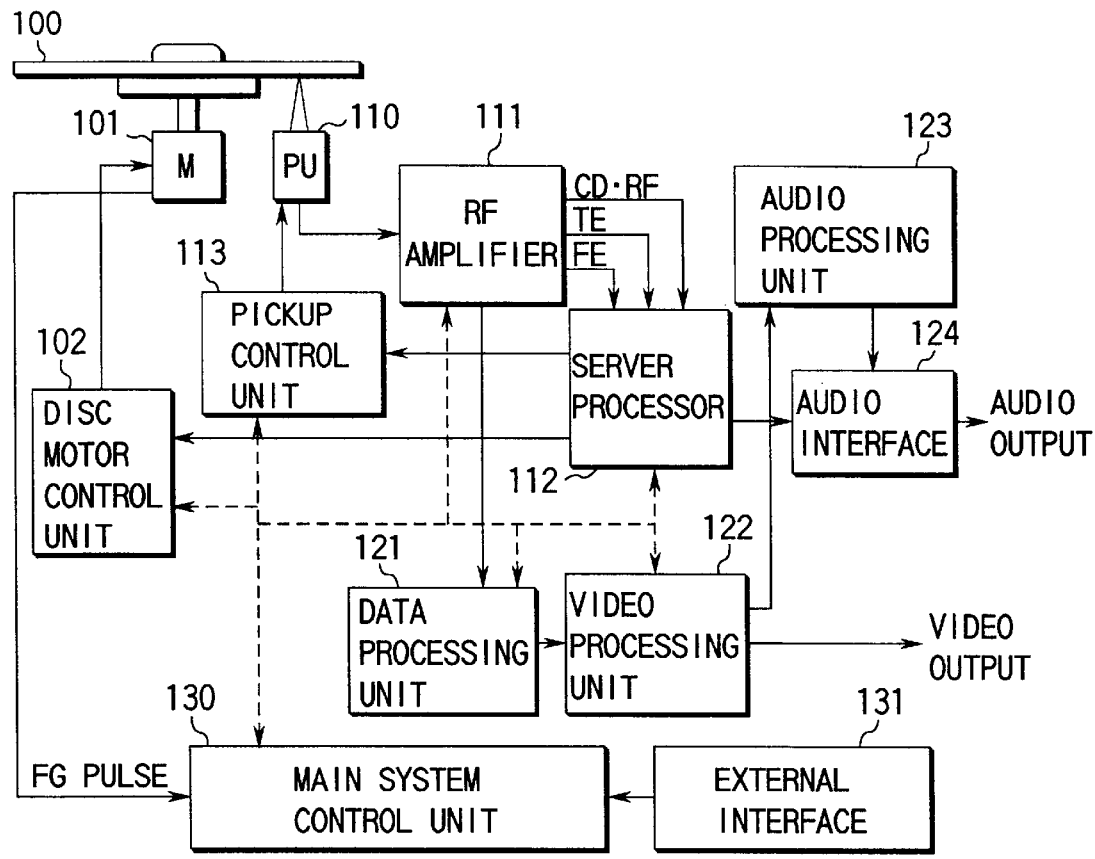
FIG. 1
FG PULSES IN A CASE WHERE ROUGH SERVO
CONTROL IS OPERATED IN DVD PROCESS MODE
FIG. 2A WHEN DISC IS CD _____ 5.6m/s
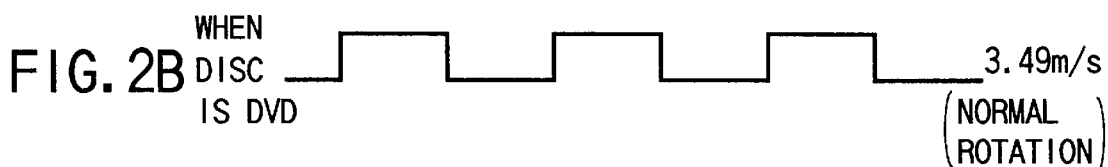
FIG. 2B WHEN DISC IS DVD _____ 3.49m/s (NORMAL ROTATION)
FG PULSES IN A CASE WHERE ROUGH SERVO
CONTROL IS OPERATED IN CD PROCESS MODE
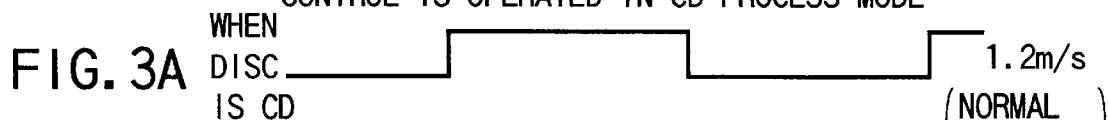
FIG. 3A WHEN DISC IS CD _____ 1.2m/s (NORMAL ROTATION)
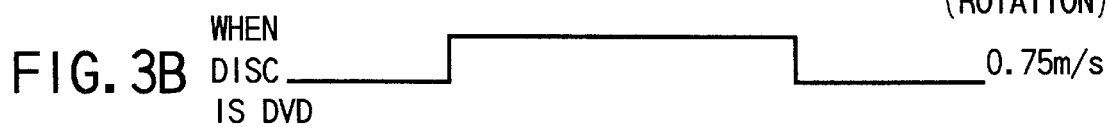
FIG. 3B WHEN DISC IS DVD _____ 0.75m/s

|  | TRACK PITCH | MAXIMUM ECCENTRICITY |
|---|---|---|
| CD | 1.6 μm | ±70 μm |
| DVD | 0.74 μm | ±100 μm |

MOVED 500 μm

VDD  (500−100)/0.74=500 TRACKS
CD   (500+70)/1.6=357 TRACKS

RF CROSS TALK=OFF TRACK RFRP AMPLITUDE/
(BOTTOM)
ON TRACK RFRP AMPLITUDE
(PEAK)

DISC DISCRIMINATING DEVICE IN DISC PLAYBACK APPARATUS

BACKGROUND OF THE INVENTION

The present invention relates to a disc discriminating device in a disc playback apparatus.

Recently, various kinds of discs have been developed and, particularly, a digital video disc (DVD) that has the same outer size as that of a well-known audio compact disc (CD) but seems hardly distinguished therefrom has been developed. In addition, a disc playback apparatus having compatibility so as to realize the playback corresponding to any disc loaded into the apparatus, has been also developed. Accordingly, when the playback apparatus is loaded with a disc, the kind of the disc needs to be discriminated.

As for discrimination of the disc type, various kinds of methods have been proposed, such as a method of preliminarily recording distinction signals in a disc and reading them, a method of setting the playback apparatus in a predetermined mode, reading signals from the disc and discriminating whether or not the signals are normal, and the like.

According to a conventional disc discriminating method, a comparatively complicated structure is required and it is expensive. In addition, much time have to be spent for the disc discrimination.

BRIEF SUMMARY OF THE INVENTION

The object of the present invention is to provide a disc discriminating device in a disc playback apparatus, which can be realized with a comparatively simple structure and spends a short time for disc discrimination.

In order to achieve this object, in the present invention, focus servo control is operated to rotate a disc at a constant linear velocity, and the rotation number of the disc motor is measured so that the kind of the disc can be discriminated.

Another object of the present invention is to discriminate the kind of the disc by rotating the disc in a state of operating the focus servo control and counting the number of tracks which a pickup crosses.

A yet another object of the present invention is to employ an optical pickup in a three-beam system, generate tracking error signals by the read output of a subbeam and thereby discriminate the kind of the disc in response to the level of the signal.

Further, the other object of the present invention is to discriminate the kind of the disc by operating the focus servo control to rotate a disc at a constant linear velocity and monitoring tracking errors, i.e., cross talks.

Moreover, the other object of the present invention is to discriminate the kind of the disc by employing an optical pickup in the push/pull detecting system and monitoring the level of tracking error signals.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a diagram showing an embodiment of the present invention;

FIG. 2A is a diagram showing waveforms of FG pulses obtained when a disc is a CD in the playback apparatus operated in the DVD process mode;

FIG. 2B is a diagram showing waveforms of FG pulses obtained when a disc is a DVD in the playback apparatus operated in the DVD process mode;

FIG. 3A is a diagram showing waveforms of FG pulses obtained when a disc is a CD in the playback apparatus operated in the CD process mode;

FIG. 3B is a diagram showing waveforms of FG pulses obtained when a disc is a DVD in the playback apparatus operated in the CD process mode;

FIG. 8A illustrates beam spots of a three-beam pickup to a CD, FIG. 8B illustrates beam spots of a three-beam pickup to a DVD, and FIG. 8C illustrates conditions of the beam reflection output corresponding to the subbeam spots;

DETAILED DESCRIPTION OF THE INVENTION

Figure 4:
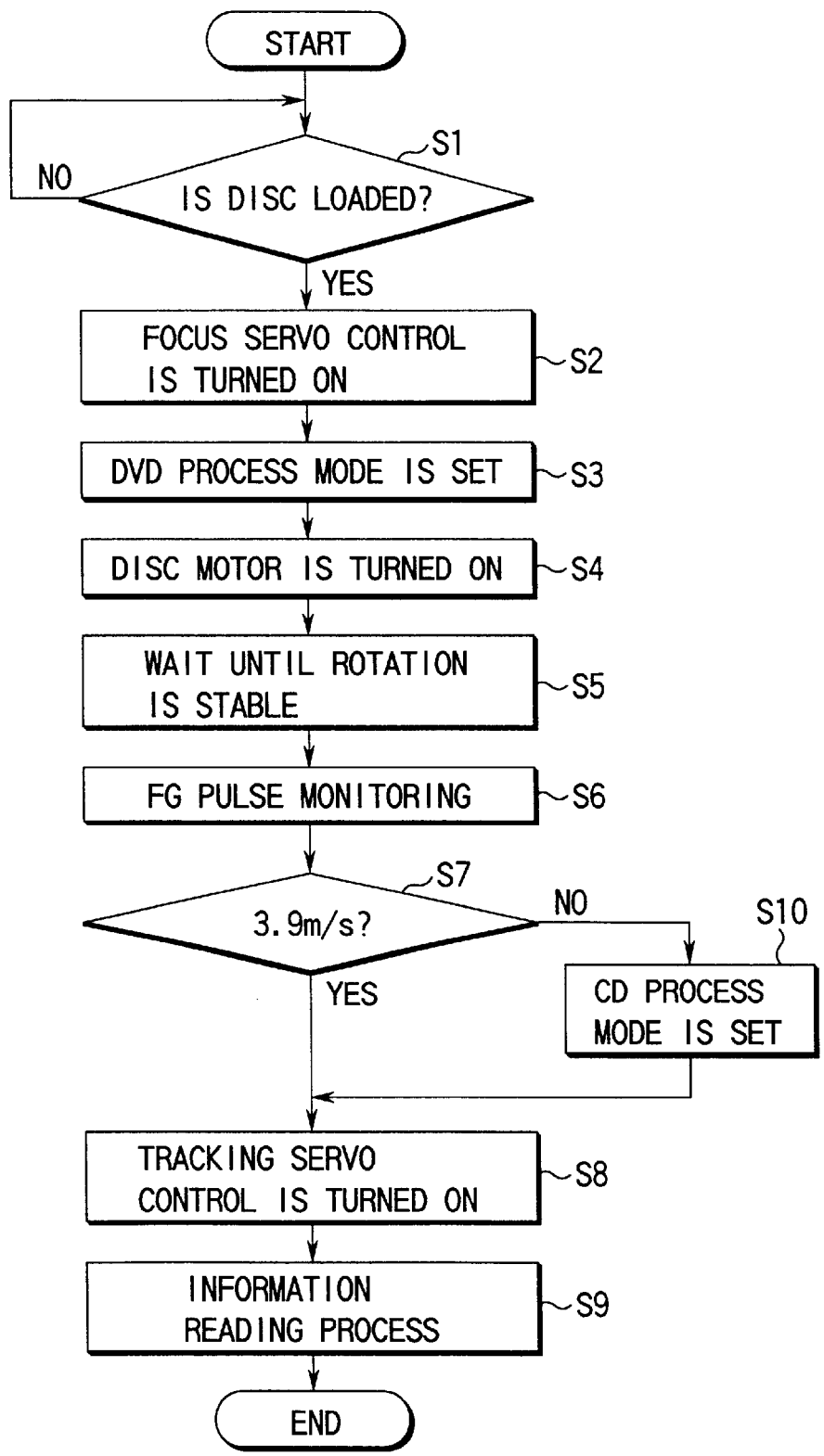
FIG. 4 is a flow chart showing an example of a process in which the device of the present invention obtains the disc discrimination output.

Embodiments of the present invention will be described below with reference to the drawing.

FIG. 1 shows an embodiment of the present invention. Reference numeral 100 denotes a disc, which is a CD (compact disc) or a DVD (digital video disc). The disc 100 is placed on a turn table, stably pressed by a clamper (not shown) and rotated by a disc motor 101 together with the turn table. The rotation of the disc motor 101 is controlled by a disc motor control unit 102.

A means for detecting the rotation of the disc motor 101 (not shown) is provided at the disc motor 101.

The rotation detecting means constituted by, for example, a plurality of permanent magnets rotated integrally with a rotary shaft and a plurality of detection elements (pickup coils or hole sensor elements) provided at fixed positions around the rotation of the plural permanent magnets. When the permanent magnets pass in the vicinity of the detection elements, a current flows to the detection elements. A signal corresponding to the current is to be a rotation detection signal. The rotation detection signal is hereinafter called a frequency generation pulse (an FG pulse). The FG pulse is input to a main system control unit 130. Processing of the FG pulse will be described later.

The information recorded on the disc 100 is read by a pickup 110. The pickup 110 irradiates a laser light beam onto recording tracks of the disc, senses the intensity of the reflected light and thereby detects a signal. The detected signal is fed to a radiofrequency amplifier 111.

A tracking error signal (TE) and a focus error signal (FE) can be obtained from the radiofrequency amplifier 111. If the loaded disc is a CD, a read signal (CD·RF) thereof can be also obtained. If the loaded disc is a DVD, a read radiofrequency signal thereof can be also obtained.

The tracking error signal and the focus error signal are input to a servo processor 112. The servo processor 112 forms a servo control signal, and feeds it to a pickup control unit 113 and the disc motor control unit 102.

The pickup control unit 113 drives a pickup feeding/retreating mechanism (not shown), a pickup tracking control mechanism (not shown), and a focus control mechanism (not shown). The disc motor control unit 102 can control the rotation of the disc motor 101, at a constant linear velocity (CLV).

A data processing unit 121 executes demodulation, error correction, classification and slicing of data, management of the control data, and the like, about the signals which are read from the DVD. Video packs and audio packs from the data processing unit 121 are fed to a video processing unit 122 and a audio processing unit 123. The video processing unit 122 decodes compressed video data in the video packs according to the compression mode. The video processing unit 122 outputs that data which is decoded and then converted in a predetermined mode. The audio processing unit 123 decodes the audio data in the audio packs. The decoded audio signals are output via an audio interface 124. When a CD is played back, audio data (linear PCM) signals which is the signal CD·RF can be fed to the audio interface 124 and decoded therein.

The above-described apparatus is entirely managed and controlled by the main system control unit 130. The main system control unit 130 is connected to an external interface 131. The operation mode of the entire playback apparatus is controlled by, for example, inputting operation signals from a remote controller to the main system control unit 130 via the external interface 131. The operation mode includes operations of play, stop, still play, reverse play, etc.

Incidentally, the disc discriminating function of this apparatus is realized as described below.

This apparatus discriminates the kind of a disc by rotating the disc at a constant linear velocity and measuring the rotation number of the disc motor while the focus servo control is operated. Its principle will be described below.

First, the FG pulse from the disc motor 101 is to be introduced into the system control unit 130. The FG pulse is measured by the system control unit 130 and thereby the rotation number of the disc motor can be obtained.

On the other hand, pit lengths of the DVD and CD are defined as described below.

Length of the minimum pit 3T of the CD:
 0.83 μm.
Length of the maximum pit 11T of the CD:
 (0.83/3)×11=about 3 μm.

Length of the minimum pit 3T of the DVD:
 0.4 μm.
Length of the maximum pit 11T of the DVD:
 (0.4/3)×14=about 1.87 μm.

T represents the unit pit length.

(1) In a case where a disc loaded into the playback apparatus is a DVD, the apparatus is operated in the following manner.

After a focus is formed on the disc, the rough servo control (rotational frequency control based on detection of the maximum pit length) at the CLV set when a disc is a DVD, is applied to the disc. At this time, the servo loop is constituted by a path.including the pickup 110, the RF amplifier 111, the servo processor 112, the disc motor control unit 102 and the disc motor 101.

It is assumed now that a disc loaded into the playback apparatus and rotated may be a DVD and the disc motor 101 may be rotated at a linear velocity of 3.49 (m/s) to the maximum pit length 14T.

This means that the rough servo loop to the DVD is controlled so that the maximum pit 14T (=1.87 (μm)) (T represents the unit pit length) of the DVD pass at the pickup beam spot position in a period of 0.54 (μs). That is, the following relationship is satisfied:

$$1/3.49 \text{ (m/s)} \times 1.87 \text{ (μs)} = 0.54 \text{ (μs)}$$

If the disc loaded into the playback apparatus and then rotated is a CD, it is rotated at the linear velocity of 5.6 (m/s) that is higher than that of a DVD because of the difference in the maximum pit length. That is, if the loaded disc is a CD, it is not rotated at 3.49 (m/s), but at the higher velocity of 5.6 (m/s).

This can be clarified by the fact that if the servo loop is controlled so that the maximum pit 11T (T; the unit pit length) of the CD can pass at the pickup beam position in a period of 0.54 (μs), X(rotary velocity)=about 5.6 (m/s) can be obtained from the equation (1/X)×3 (μm)(the length of the maximum pit 11T of the CD)=0.54 (μs).

FIG. 2A shows an FG pulse obtained when the CD is loaded in the playback apparatus and the rough servo control functions in the DVD playback mode. FIG. 2B shows an FG pulse obtained when the DVD is loaded in the playback apparatus and the rough servo control functions in the DVD playback mode. As understood from the figures, the frequency obtained when the CD is loaded is higher than that when the DVD is loaded.

(2) Next, a case where the rough servo control functions in the CD playback mode, reversely with the above case, will be explained.

It is assumed now that a disc loaded into the playback apparatus and rotated may be a CD and the disc motor 101 may rotate at the linear velocity of 1.2 (m/s) to 1.4 (m/s) to the maximum pit length 11T.

This means that the rough servo loop to the CD is controlled so that the maximum pit 11T (T represents the unit pit length) of the CD pass at the pickup beam spot position in a period of 2.5 (μs) to 2.14 (μs). That is, the following relationships are satisfied:

$$1/1.2 \text{ (m/s)} \times 3 \text{ (μs)} = \text{about } 2.5 \text{ (μs)}$$

$$1/1.4 \text{ (m/s)} \times 3 \text{ (μs)} = \text{about } 2.13 \text{ (μs)}$$

If the disc loaded into the playback apparatus and then rotated is a DVD, it is rotated at the linear velocity of 0.75 (m/s) to 0.87 (m/s) that is higher than that of a DVD because of the difference in the maximum pit length. That is, if the loaded disc is a DVD, it is not rotated at 2.5 (m/s) to 2.14 (m/s), but at the lower velocity of about 0.75 (m/s) to 0.87 (m/s).

This can be clarified by the fact that if the servo loop is controlled so that the maximum pit 14T (T; the unit pit length) of the DVD can pass at the pickup beam position in a period of 2.5 ($\mu$s) to 2.14 ($\mu$s), X(rotary velocity)=about 0.75 (m/s) or X(rotary velocity)=about 0.87 (m/s)

can be obtained from the following equations:

(1/X)×1.87 ($\mu$m)(the length of the maximum pit 14T of the DVD)=2.5 ($\mu$s), and (1/X)×1.87 ($\mu$m)(the length of the maximum pit 14T of the DVD)=2.14 ($\mu$s).

FIG. 3B shows an example of the FG pulse obtained under the above-described conditions. It can be understood that the frequency obtained when the DVD is loaded is lower than that when the CD is loaded. Thus, DVD/CD can be discriminated by monitoring the FG pulse.

As described above, a DVD is different from a CD in maximum pit length (1.47 $\mu$m in a DVD, and 3 $\mu$m in a CD). For this reason, for example, when the rotation of a CD is to be controlled in the DVD process mode, the CD is rotated at a higher velocity, i.e. about 35 Hz, than a DVD, which is originally rotated at approximately 22 Hz at its innermost periphery (r=25 mm). To the contrary, when the rotation of a CD is to be controlled in the CD process mode, the DVD is rotated in the CD process mode at a lower velocity, i.e. approximately 4.8 Hz, than a CD, which is rotated in the CD process mode at 7.6 to 9 Hz at its innermost periphery (r=25 mm).

Thus, the type of the current loaded disc in the playback apparatus can be discriminated.

The above-described discriminating device is available for a playback apparatus using a one-lens pickup. Further, the device is also available for a disc in the CLV system, i.e. in the constant linear velocity recording system. Therefore, the device is available for not only DVDs and CDs but also other discs such as CD-ROMS, to obtain an output which is distinguishable from that of a DVD.

FIG. 4 represents the steps of operation of the above-described disc discriminating function.

The operation of the disc discriminating function is started when, for example, the play is operated. When the play is operated, it is discriminated whether or not a disc has been loaded in the playback apparatus (step S1). The means for discriminating the loading of a disc can employ various kinds of methods, for example, a method of detecting a disc by an optical type detector, a method of detecting a disc by a mechanical detection system, and the like. When it is recognized that a disc has been loaded, the focus servo control of the servo loop is carried out (step S2), so that the spot of the laser beam irradiated from the pickup 110 to the disc can be focused on the disc. Next, the playback apparatus sets the function of the rough servo control in an assumption that the loaded disc may be a DVD (step S3). Next, the disc motor 102 is turned on (step S4), and the apparatus waits in a certain time until the rotation becomes stable (step S5). Next, the frequency of the FG pulse obtained from the disc motor 101 is monitored (step S6). It is discriminated here whether or not the rotation frequency is approximate to 3.9 (m/s) (step S7). When the rotation frequency is approximate to 3.9 (m/s), the tracking servo loop is turned on (step S8), and the mode is shifted to the information reading and processing mode (step S9). When the rotation frequency is not approximate to 3.9 (m/s), it is discriminated that the loaded disc is a CD, and the mode of the playback apparatus is shifted to the CD signal processing mode (step S10). Finally, the tracking servo loop is turned on (step S8), and the mode is shifted to the information reading and processing mode (step S9).

Figure 5:
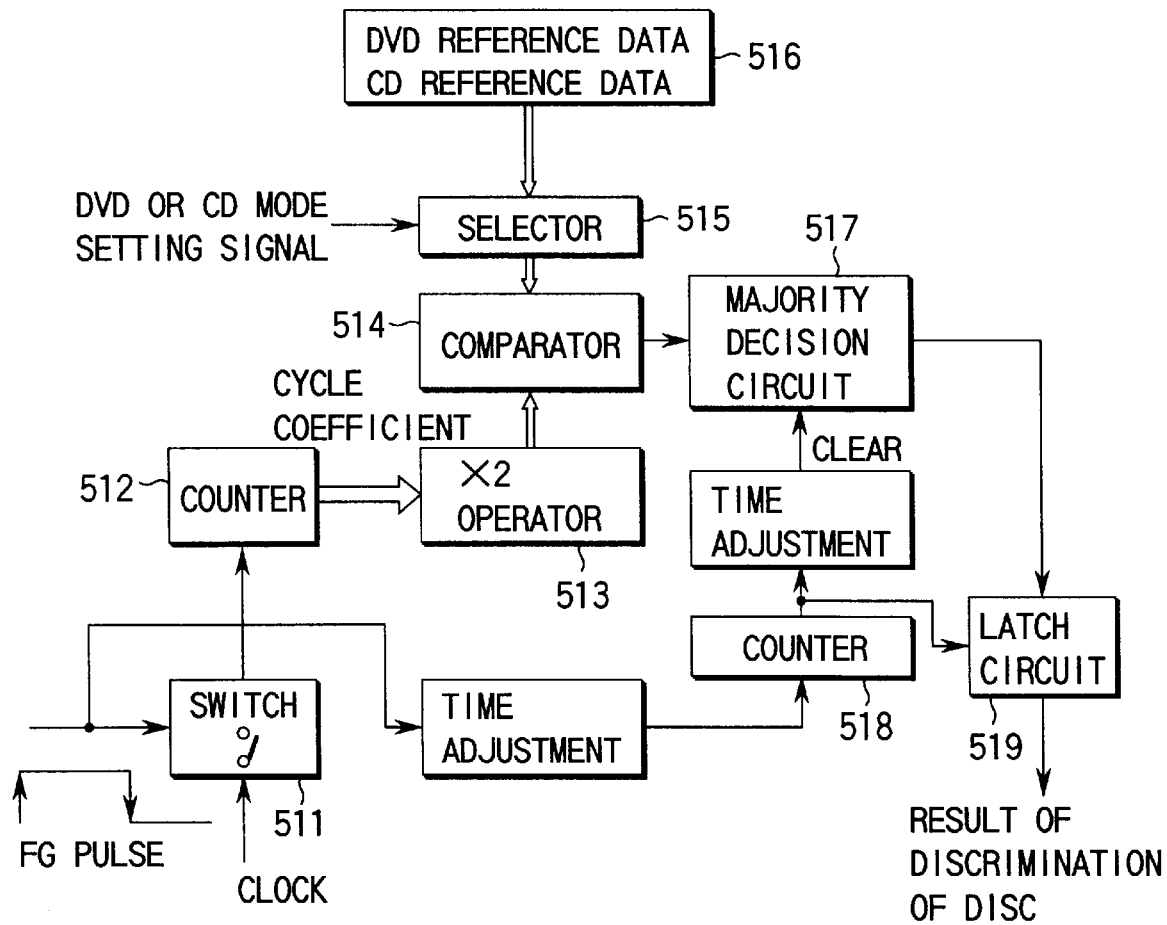
FIG. 5 is a diagram showing a block functioning to obtain the disc discrimination output in the present device.

FIG. 5 shows an example of constitution of the hardware for monitoring the frequency of the FG pulse and obtaining the results of discrimination of the disc, in the system control unit 130.

A switch 511 is turned on at the rise of the FG pulse or its frequency division output pulse, and is turned off at the fall thereof. When the switch 511 is turned on, it supplies a high-speed clock to a counter 512. The count output of the counter 512 is input to an operator 513. The count output of the counter 512 is supplied to the operator 513 at a next clock at which the switch 512 is turned off, and further cleared at a next clock.

The operator 513 doubles the input data. Thus, a value corresponding to the cycle of the FG pulse can be obtained. The output of the operator 513 is supplied to a comparator 514, and is compared with an output of a selector 515. The selector 515 selects the reference data stored in a reference data storing unit 516 and supplies it to the comparator 514. The reference data storing unit 516 stores DVD reference data and CD reference data. When the playback apparatus is set in the DVD process mode, the selector 515 selects the DVD reference data. When the playback apparatus is set in the CD process mode, the selector 515 selects the CD reference data.

The comparator 514 corresponds to the process in step S7 in FIG. 4. That is, it outputs, for example, "1" (representing YES) when the playback apparatus is in the DVD process mode and the output of the operator 513 is the data corresponding to 3.9 m/s, and outputs "0" (representing NO) when they are not. The output of the comparator 514 is input to a majority decision circuit 517. This majority decision circuit 517, for example, decides by majority the frequency discrimination output in a period of some cycles of the FG pulse. For example, when a period of 20 cycles of the FG pulse has passed, the pulse is output from a counter 518 and the result of decision of the majority decision circuit 517 is latched by a latch circuit 519. The output of the latch circuit 519 is regarded as the result of discrimination of the disc. After the result of discrimination is output, the output pulse of the counter 518 is adjusted in time and the contents of the majority decision circuit 517 is cleared.

The present invention is not limited to the above-described embodiment.

Figures 6, 7:
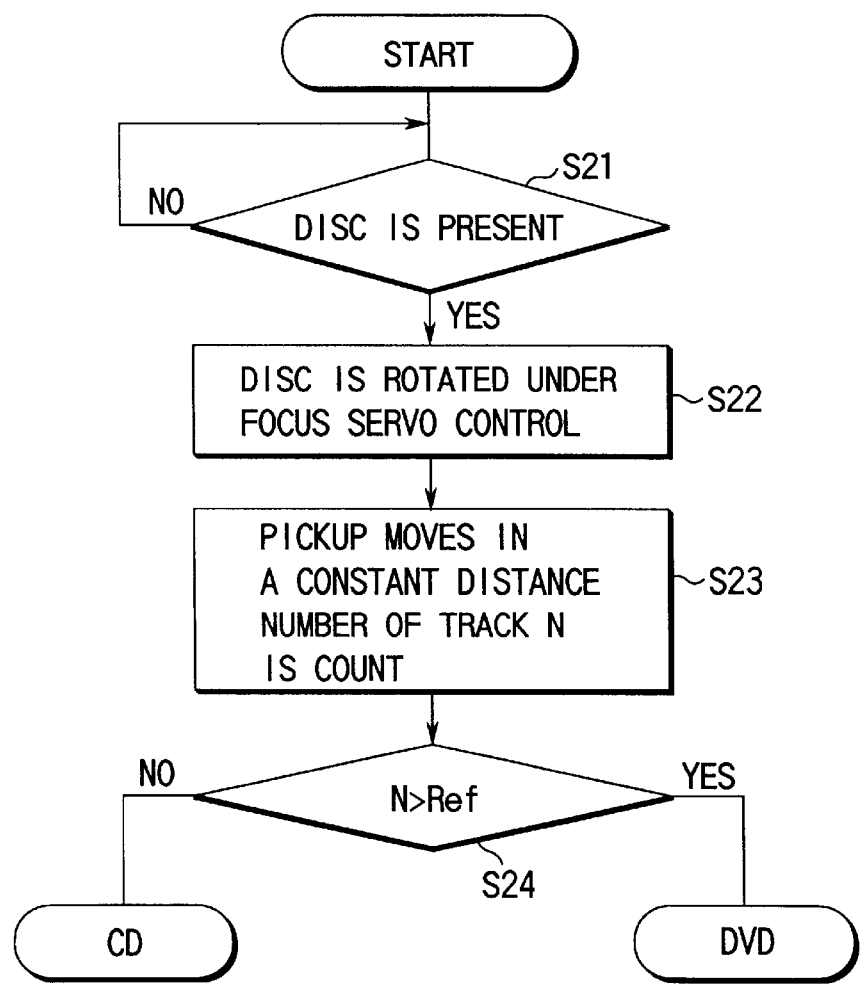
FIG. 6 is a table showing the relationship between the track pitch of a CD and that of a DVD.
FIG. 7 is a flow chart explaining an example of operations of a second embodiment according to the present invention.

Next, FIG. 6 will be reviewed. The track pitch of a CD is 1.6 $\mu$m and the maximum eccentricity thereof is ±70 $\mu$m. The track pitch of a DVD is 0.74 $\mu$m and the maximum eccentricity thereof is ±100 $\mu$m. First, when a disc is loaded, the disc is operated under the focus servo control and rotated. Then, the pickup 110 is moved in a certain distance in a direction crossing the tracks (the distance is set in consideration of the eccentricity of a DVD and that of a CD). At this time, when the read signal (called a radiofrequency ripple (RFRP) signal in this case) is monitored, the number of tracks can be recognized. The number of tracks on the DVD is double as many as that on the CD as the. track pitch of the DVD is 0.74 $\mu$m and that of the CD is 1.6 $\mu$m. Thus, by detecting the number of tracks, it is possible to discriminate whether a current loaded disc is a DVD or a CD.

FIG. 7 illustrates a disc discrimination algorithm that is set in the main system control unit 130. When it is discriminated that a disc has been loaded, the disc is rotated under the focus servo control, and the pickup is moved in a certain distance to count the number of tracks on the disc (steps S21, S22 and S23). For example, if the pickup is moved in 500 µm, about 500 tracks on a DVD or about 357 tracks on a CD can be counted. The comparison value Ref may be set at either 400 or 450.

Next, the comparison value Ref is compared with the number of tracks N as represented by step S24. If N is larger than Ref, it is discriminated that a DVD has been loaded, and if it is not, it is discriminated that a CD has been loaded.

Another disc discriminating function of the apparatus is realized as described below.

That is, an optical pickup of a three-beam type is used, a tracking error signal is generated by the read output of a subbeam, and the kind of the disc is discriminated in response to the level of the signal.

Figures 8A, 8B:
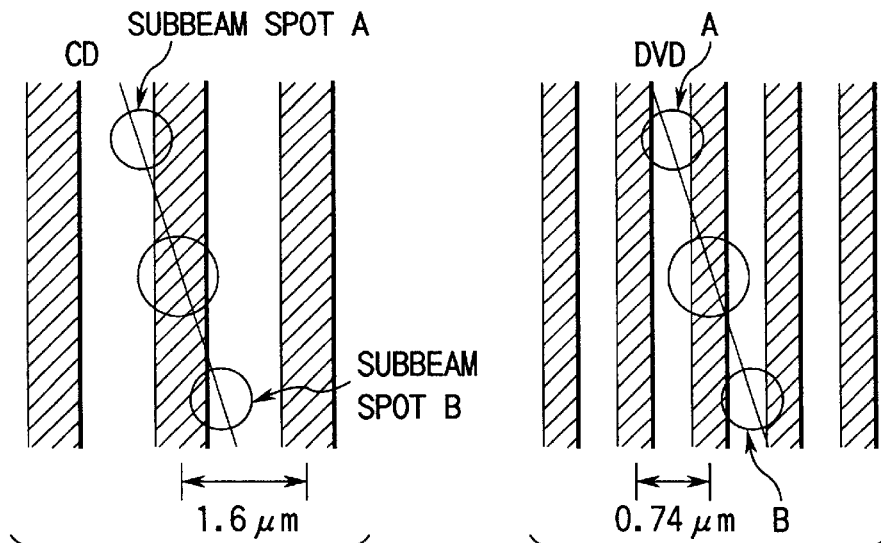
FIGS. 8A–8C are views explaining a principle of a third embodiment of the present invention, i.e.
Figure 8C:
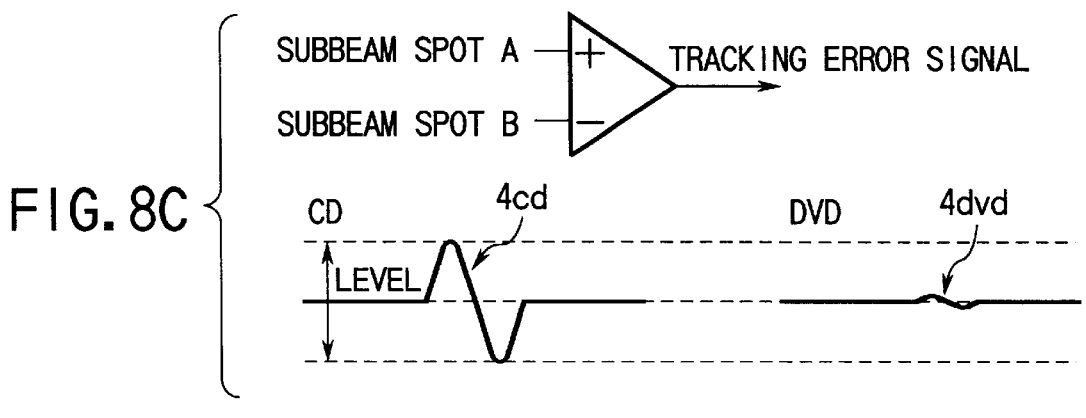

FIGS. 8A to 8C show the principle of the system of discriminating a disc on the basis of the read output of the subbeam. The laser beam is focused on the disc under the focus servo control to rotate the disc. The pickup 110 is stopped at a constant position. Thus, the beam spot of the pickup 110 crosses the tracks, and a tracking error output shown in FIG. 8C can be obtained from the output of the detector. When the disc loaded in the playback apparatus is a CD, the tracking error output looks like a signal 4cd in FIG. 8C. When the disc loaded in the playback apparatus is a DVD, the tracking error output looks like a signal 4dvd in FIG. 8C. That is, the amplitude of the error signal becomes larger when the loaded disc is a CD and becomes smaller when the loaded disc is a DVD.

The reason is that, in a case of a CD, the track pitch of the CD is 1.6 µm as shown in FIG. 8A, and a time when a subbeam spot A overlaps the reflection row (i.e. the part having no pit row) during one rotation of the disc and a time when a subbeam spot A overlaps the reflection row (i.e. the part having no pit row) alternately reach. On the other hand, in a case of a DVD, each of subbeam spots A and B always overlaps one or two reflection rows since the track pitch of the DVD is narrow, i.e. 0.74 µm as shown in FIG. 8B, and this is why a rate at which the subbeam spot A overlaps the reflection rows during one rotation of the disc is always substantially equal to a rate at which the subbeam spot B overlaps the reflection rows.

As described above, it is possible to discriminate whether the current loaded disc is a CD or a DVD by monitoring the amplitude of the tracking error signal.

Figure 9:
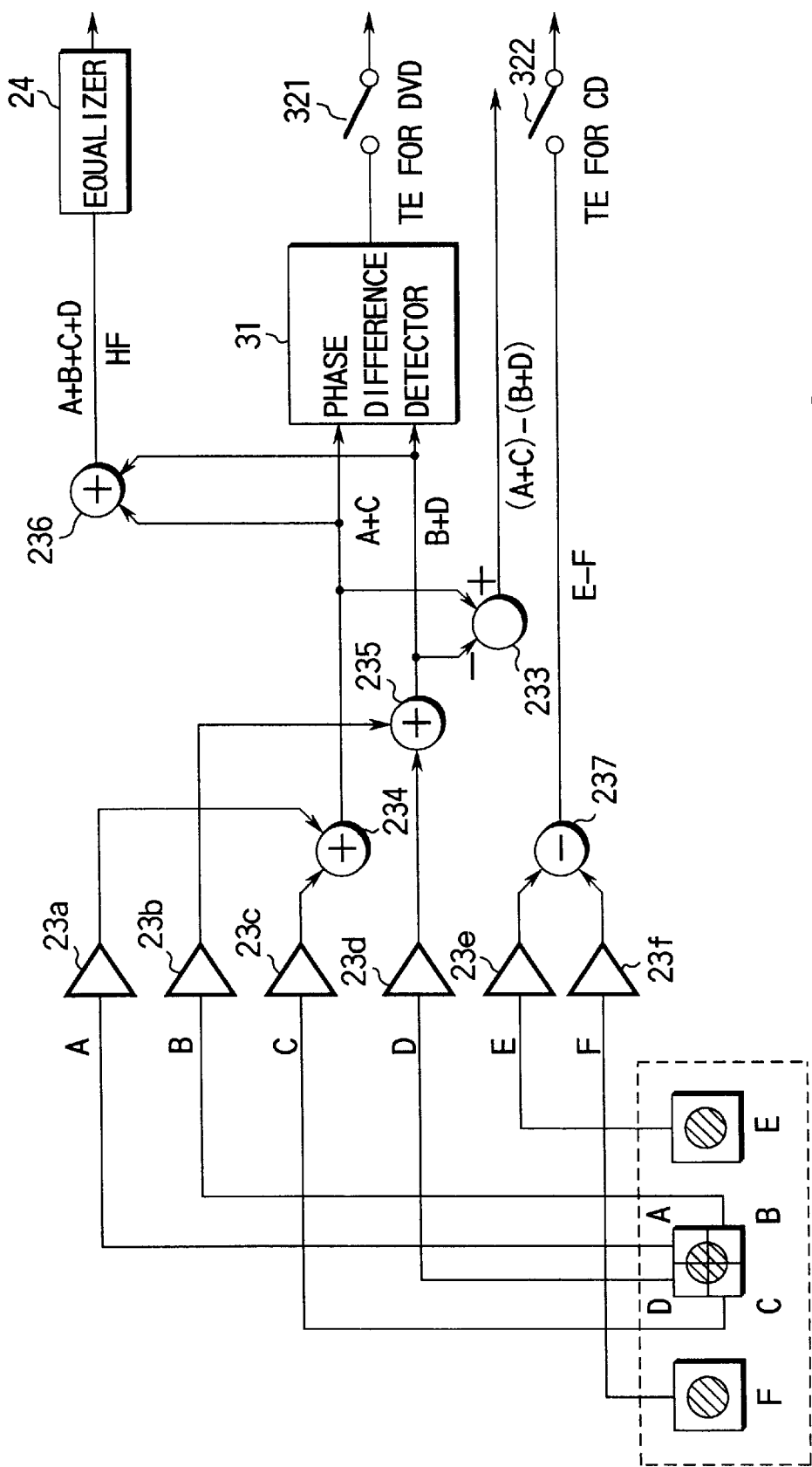
FIG. 9 is a diagram showing an example of structure of a portion including the pickup device and the RF amplifier.

Next, the pickup of a three-beam system will be briefly explained by referring to FIG. 9.

The figure illustrates arrangement of photodiodes A to F constituting a light detecting unit of the pickup 110, and an interior of the radiofrequency amplifier 111. Outputs of the photodiodes A to F are introduced respectively into buffer amplifiers 23a to 23f.

A to F signals output from the buffer amplifiers 23a to 23f are operated as explained below.

A subtracter 233 generates an (A+C)−(B+D) signal by using an (A+C) signal from an adder 234 and a (B+D) signal from an adder 235. This (A+C)−(B+D) signal is used as a focus error signal.

This focus error signal is used as an element for the above-described disc discrimination.

The adder 234 generates the (A+C) signal and the adder 235 generates the (B+D) signal. The (A+C) signal and the (B+D) signal are input to a phase difference detector 31. An output of the phase difference detector 31 is used as a DVD tracking error signal. That is, when the apparatus is in the DVD mode, a switch 321 is controlled to be turned on. At this time, an (E−F) signal obtained on the basis of a detection signal of a subbeam is denied by turning off a switch 322.

The (A+C) signal and the (B+D) signal are also input to an adder 236. The adder 235 generates an (A+B+C+D) signal (referred to as an HF signal).

An E signal and an F signal are input to an adder 237. An (E−F) signal is obtained from the adder 237. The (E−F) signal is used as a CD tracking error signal. That is, when the apparatus is in the CD mode, the switch 322 is controlled to be turned on.

When the disc is discriminated, the signal (E−F) is introduced into a system control unit and its amplitude is measured.

The disc discriminating function according to another embodiment of the present apparatus will be described below.

That is, the kind of a disc is discriminated by rotating the disc at a constant linear velocity (CLV servo) under the focus servo control, and monitoring the tracking error, i.e. the crosstalk. For example, the kind of the disc can be discriminated by measuring the level difference between a peak and a bottom of the output (RFRP signal) of the adder 236 or an equalizer 24 in FIG. 9.

Figure 10A:
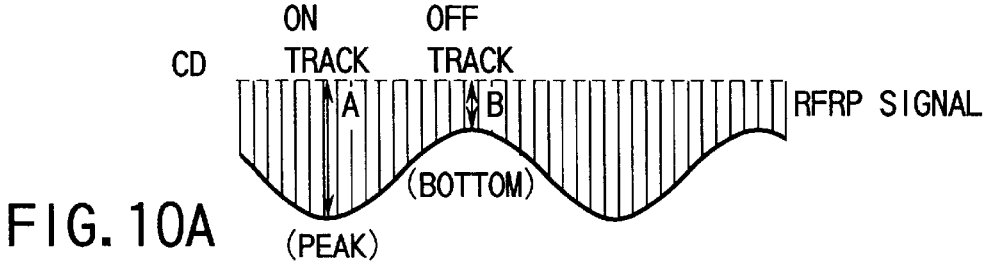
FIGS. 10A and 10B are diagrams showing a principle of a fourth embodiment of the present invention.
Figure 10B:
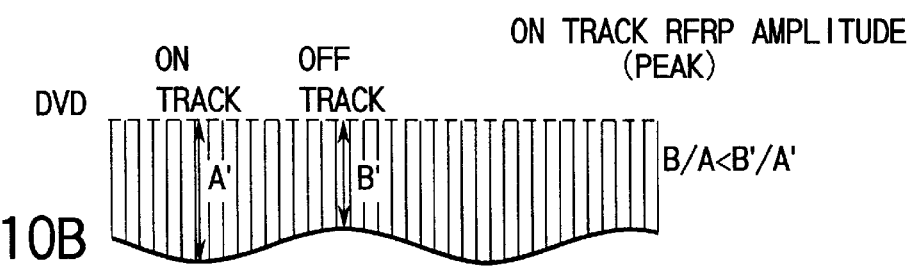

FIGS. 10A and 10B show an example of rotating a disc under the CLV servo control and measuring the RFRP signal. As understood from FIG. 10A, when the disc is a CD, the difference between the amplitude at on-track (i.e. a peak of the RFRP signal) and that at off-track (i.e., a bottom thereof) becomes larger. On the other hand, when the disc is a DVD, the difference in amplitude is smaller as understood from FIG. 10B. Therefore, a ratio of the on-track to the off-track (or an RF crosstalk) is different in a CD and a DVD. The reason is that the track pitch of the CD is 1.6 µm while that of the DVD is 0.74 µm, and the track can be influenced by adjacent tracks on the DVD because of the high density.

That is, when the peak and bottom of the amplitude of the RFRP signal are detected, the amount of the crosstalk is calculated in the following manner and the amount is compared with a preset threshold value, it can be discriminated whether the detected signal is a signal of the DVD or that of the CD.

Amount of Crosstalk=(Amplitude at the Off-track (or the Bottom) of the RFRP Signal)/(Amplitude at the On-track (or the Peak) of the RFRP Signal).

The amplitude at the bottom can be detected by, for example, transmitting the RFRP signal to a negative input terminal of a differential amplifier, supplying the amplifier output to a first peak detector and obtaining an output of the first peak detector. The amplitude at the peak can be detected by transmitting the RFRP signal to a positive input terminal of the differential amplifier, supplying the amplifier output to a second peak detector and obtaining an output of the second peak detector.

Figure 11A:
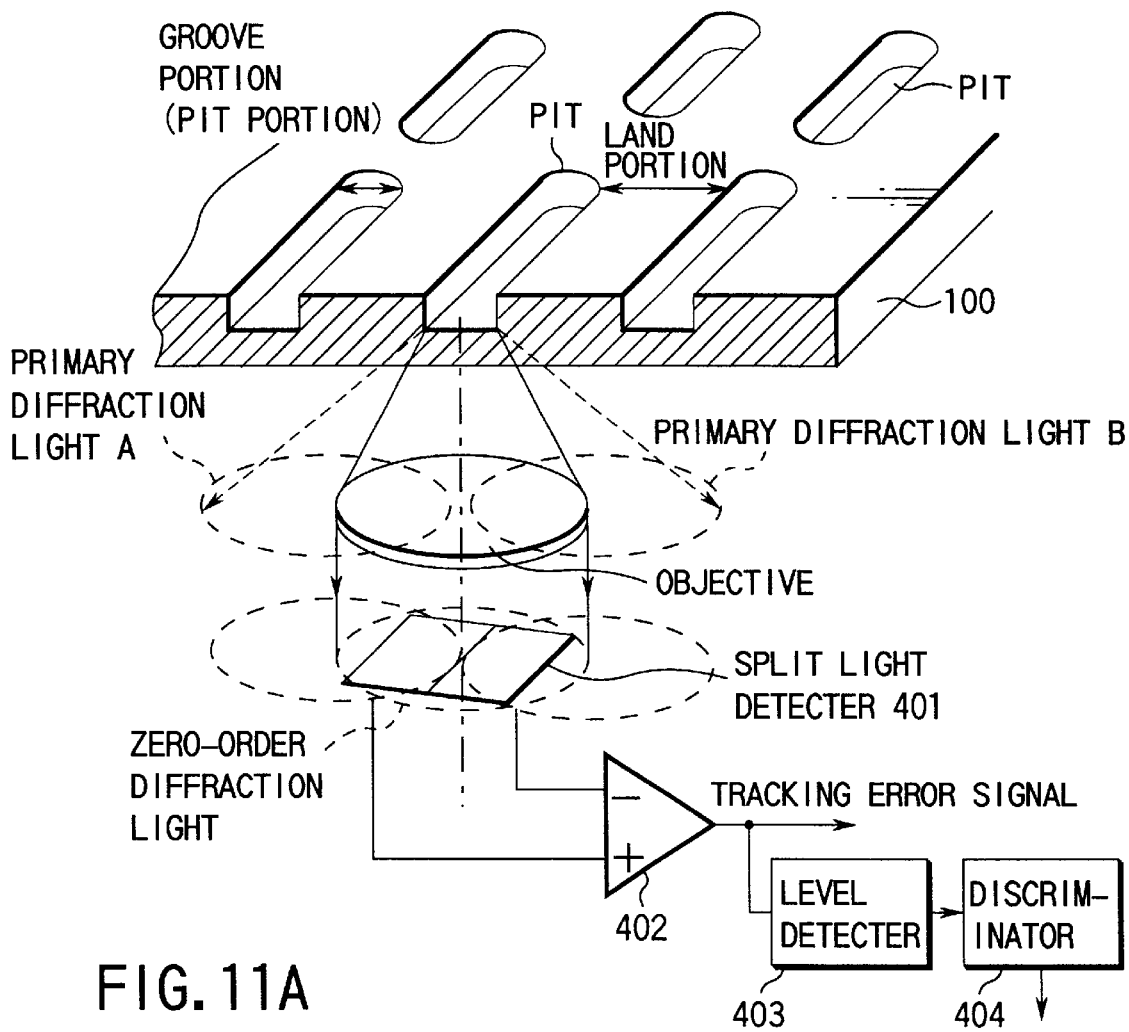
FIGS. 11A and 11B are diagrams showing a principle of a fifth embodiment of the present invention.

FIG. 11A shows a principle of a method which is effective when the optical pickup is in the push/pull type.

In the case of a push/pull type optical pickup, when the laser beam traces the tracks, it passes through a disc 100 to be a straight zero-order diffraction light beam at the part of the disc having no pits, and to be primary diffraction light beams A and B at the part thereof having the pits. This is because a light beam passing through a pit and a light beam passing around the pit interfere with one another. Thus, when the laser beam traces the tracks (i.e. when the disc is rotated), the primary diffraction light beam (data 0) or the zero-order diffraction light beam (data 1) appears in response to the presence/absence of the pit, the light beam is detected by a light detector 401 and thereby the recorded information can be read.

The light detector 401, split into two, i.e. left and right parts, is designed such that left and right primary diffraction light beams A and B applied uniformly to left and right elements if the tracking is preferable. Therefore, if outputs of the left and right elements are input to a comparator 402 when the tracking is normal, the level of the tracking error signal which is an output of the comparator 402 is zero. However, if the tracking is displaced, the primary diffraction light beams A and B become unbalanced, and the output of any one of the elements becomes larger while the output of the other element becomes smaller. Thus, the tracking displacement can be thereby detected. The disc may be in the light transmission type or the reflection type.

The primary diffraction light beams A and B are generated by the interference between the light beam passing through the pit and the light beam passing around the pit, and its intensity influences the depth of the pit.

Figure 11B:
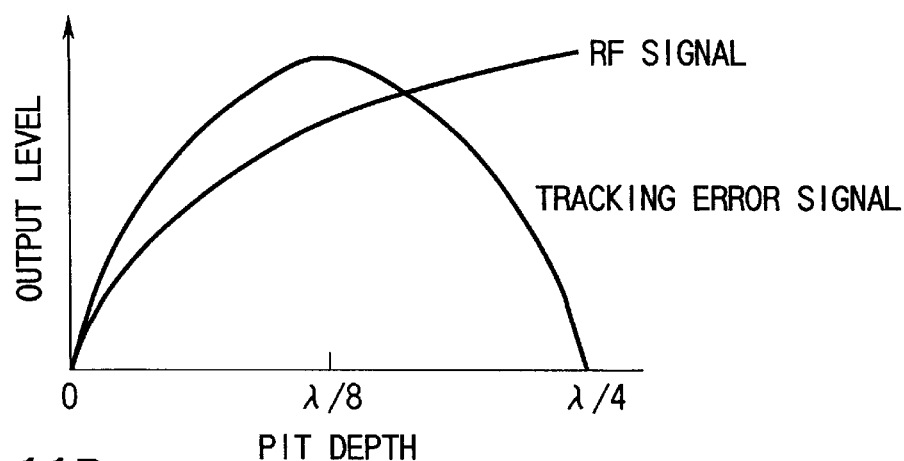

That is, as shown in FIG. 11B, when the depth of the pit is $\lambda/8$, the level of the tracking error signal is highest. When the depth of the pit is $\lambda/4$, the phase difference between the light beams reflected and diffracted respectively at pit portions (groove portions) becomes $\pi$. Therefore, the light beams interfere with one another and mutually erase so that their levels are suppressed. If there are not pit portions, the same amounts of light return at two light receiving elements of the split light detector 401 and the difference signal becomes zero.

The depth of the pit on a CD ranges from $\lambda/6$ to $\lambda/8$ while that on a DVD is about $\lambda/4$. Therefore, if a DVD is loaded and focusing on the disc is carried out to detect the tracking error signal, the signal level is lower than that when a CD is loaded. On the basis of this level difference, the disc discrimination can be carried out.

Five methods and devices relating to the disc discrimination have been described above. However, the disc discrimination is not limited to those and, of course, methods realized by combining those methods and their devices may be also employed.

The above-described embodiments will be summarized below.

(1) A disc playback apparatus for reading information recorded on an optical disc, by optical pickup means, comprises level detecting means for taking a tracking error signal from the optical pickup in a push/pull type and detecting a level of the tracking error signal, and means for obtaining an output of discrimination of the kind of the current optical disc on the basis of the magnitude of the level detected by the level detecting means. The means for obtaining the discrimination output discriminates a CD when the level of the tracking error signal is high or a DVD when the level thereof is low.

(2) A disc playback apparatus for reading information recorded on an optical disc, by optical pickup means, comprises means, in a state where the optical pickup means applies a light beam onto the optical disc, for moving the optical pickup means in a direction in which the light beam crosses tracks on the disc, and means for measuring the number of tracks by referring to ripple components of a radiofrequency signal which has been read at the movement of the optical pickup means and obtaining an output of discrimination of the kind of the current disc on the basis of the measured value.

(2-1) The means for obtaining the discrimination output obtains an output of discriminating the optical disc having more tracks as a DVD.

(3) A disc playback apparatus for reading information recorded on an optical disc, by optical pickup means, comprises pickup means for applying a main beam and two subbeams onto an optical disc and obtaining a tracking error signal from a difference signal of reflected light of the two subbeams, means for detecting an amplitude of the tracking error signal, and means for obtaining an output of discrimination of the kind of the current optical disc on the basis of the detection result from the amplitude detecting means.

(3-1) The means for obtaining the discrimination output discriminates a CD when the amplitude is large or a DVD when the amplitude is small.

(4) A disc playback apparatus for reading information recorded on an optical disc, by optical pickup means, comprises means for rotating the optical disc, means for detecting crosstalk of a radiofrequency signal from the optical pickup means which has been read during the rotation of the optical disc, and means for obtaining an output of discrimination of the kind of the current optical disc on the basis of the magnitude of the crosstalk. The means for obtaining the discrimination output discriminates a DVD when the crosstalk is large or a CD when the crosstalk is small.

(5) A disc playback apparatus for reading information recorded on an optical disc, by optical pickup means, comprises a disc motor for rotating the optical disc, means for driving the disc motor, assuming that the optical disc may be predetermined disc, and rotating the disc under the servo control in a constant linear velocity, and means for obtaining output of discrimination of the kind of the current optical disc on the basis of a frequency of rotation detection pulse of the disc motor driven by the disc rotation controlling means.

(5-1) The means for obtaining the discrimination output discriminates a CD when the frequency of the rotation detection pulse is high or a DVD when the frequency is low.

As described above, according to the present invention, the disc discriminating device having a simple structure can be realized, and a disc can be discriminated by the device immediately after it is loaded.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disc discriminating device, in a disc playback apparatus for reading information recorded on an optical disc by optical pickup means, comprising:

a disc motor for rotating the optical disc;

disc rotation control means for driving the disc motor, setting the optical disc as a predetermined kind of disc, and rotating the optical disc by a servo function at a constant linear velocity; and discrimination means, using a frequency value of a rotation detection pulse of the disc motor, for discriminating of a kind of a current optical disc, by detecting whether or not the frequency value is an expected frequency value.

2. A disc discriminating device according to claim 1, wherein the discrimination means has means for obtaining an output of discrimination of a digital video disc or a compact disc as the optical disc.

3. A disc discriminating device according to claim 2, wherein the discrimination means includes means for obtaining an output of discriminating that a disc loaded in the apparatus is a DVD when the frequency of the rotation detection pulse is lower than a predetermined value.

4. A disc discriminating device according to claim 2, wherein the discrimination means includes means for obtaining an output of discriminating that a disc loaded in the apparatus is a CD when the frequency of the rotation detection pulse is higher than a predetermined value.

5. A disc discriminating device, in a disc playback apparatus for reading information recorded on an optical disc by an optical pickup mechanism, comprising:

a disc motor configured to rotate the optical disc;

a disc rotation control unit configured to drive the disc motor, to set the optical disc as a predetermined kind of disc, and to rotate the optical disc by a servo function at a constant linear velocity; and a discrimination mechanism configured to determine, using a frequency value of a rotation detection pulse of the disc motor, a kind of a current optical disk by, detecting whether or not the frequency value is an expected frequency value.

6. A disc discriminating device according to claim 5, wherein the discrimination mechanism obtains an output of discrimination of a digital video disc or a compact disc as the optical disc.

7. A disc discriminating device according to claim 6, wherein the discrimination mechanism obtains an output of discriminating that a disc loaded in the apparatus is a DVD when the frequency of the rotation detection pulse is lower than a predetermined value.

8. A disc discriminating device according to claim 6, wherein the discrimination mechanism obtains an output of discriminating that a disc loaded in the apparatus is a CD when the frequency of the rotation detection pulse is higher than a predetermined value.

* * * * *